United States Patent
Li et al.

(10) Patent No.: US 10,621,104 B2
(45) Date of Patent: Apr. 14, 2020

(54) VARIABLE CACHE FOR NON-VOLATILE MEMORY

(71) Applicant: Hewlett Packard Enterprise Development LP, Houston, TX (US)

(72) Inventors: Pengcheng Li, Palo Alto, CA (US); Dhruva Chakrabarti, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/756,946

(22) PCT Filed: Sep. 25, 2015

(86) PCT No.: PCT/US2015/052254
§ 371 (c)(1),
(2) Date: Mar. 1, 2018

(87) PCT Pub. No.: WO2017/052595
PCT Pub. Date: Mar. 30, 2017

(65) Prior Publication Data
US 2018/0253384 A1 Sep. 6, 2018

(51) Int. Cl.
*G06F 12/0893* (2016.01)
*G06F 12/0804* (2016.01)
*G06F 12/12* (2016.01)

(52) U.S. Cl.
CPC ...... *G06F 12/0893* (2013.01); *G06F 12/0804* (2013.01); *G06F 12/12* (2013.01); *G06F 2212/222* (2013.01); *G06F 2212/72* (2013.01)

(58) Field of Classification Search
CPC ............. G06F 12/0804; G06F 12/0893; G06F 2212/72; G06F 2212/222; G06F 12/12
See application file for complete search history.

(56) References Cited

U.S. PATENT DOCUMENTS

| 7,856,531 B2 | 12/2010 | Bruening et al. |
| 8,627,012 B1 | 1/2014 | Derbeko et al. |
| 8,788,758 B1 * | 7/2014 | de la Iglesia ......... G06F 12/123 711/136 |

(Continued)

FOREIGN PATENT DOCUMENTS

| WO | WO-0144947 | 6/2001 |
| WO | WO-2008084341 | 7/2008 |

OTHER PUBLICATIONS

Xu, Z. W. et al.; "The Batch Patching Algorithm Using Dynamic Cache of Proxy for Streaming Media"; Aug. 18-21, 2005, 2 Pages.

(Continued)

*Primary Examiner* — David Yi
*Assistant Examiner* — Zubair Ahmed
(74) *Attorney, Agent, or Firm* — Hewlett Packard Enterprise Patent Department

(57) ABSTRACT

Examples herein involve a variable cache. An example variable cache controller obtains cache lines corresponding to accesses of a non-volatile memory of a system, monitors access history of the non-volatile memory, determines a number of distinct objects accessed in the access history during a time period from the object information, and sets a size of a variable cache of the system based on the number of distinct objects accessed in the access history during the time period.

12 Claims, 7 Drawing Sheets

(56) References Cited

U.S. PATENT DOCUMENTS

| | | | |
|---|---|---|---|
| 2005/0080994 A1 | 4/2005 | Cohen et al. | |
| 2007/0192543 A1* | 8/2007 | Naik | G06F 12/0891 711/133 |
| 2008/0168103 A1* | 7/2008 | Rakic | G06F 16/2379 |
| 2012/0124295 A1* | 5/2012 | Humlicek | G06F 12/0646 711/136 |
| 2012/0311405 A1 | 12/2012 | Kanai et al. | |
| 2013/0219122 A1 | 8/2013 | Benhase et al. | |

OTHER PUBLICATIONS

Beckmann et al., "Talus: A simple way to remove cliffs in cache performance", Proceedings of the 21st International Symposium on High Performance Computer Architecture (HPCA), 2015, 12 pages.

Chakrabarti et al., "Atlas: leveraging locks for non-volatile memory consistency", In Proceedings of the 2014 ACM International Conference on Object Oriented Programming Systems Languages & Applications (OOPSLA '14), ACM, New York, NY, USA, 2014, 14 pages.

Ding et al., "Predicting whole-program locality through reuse distance analysis", In Proceedings of the ACM SIGPLAN 2003 conference on Programming language design and implementation (PLDI '03), 2003, pp. 245-257.

International Search Report and Written Opinion received for PCT Patent Application No. PCT/US2015/052254, dated Jun. 23, 2016, 11 pages.

Li et al., "Modeling heap data growth using average liveness", In Proceedings of the 2014 international symposium on Memory management, (ISMM '14), ACM, New York, NY, USA, 2014, pp. 71-82.

Meng et al., "vCacheShare: automated server flash cache space management in a virtualization environment", In Proceedings of the 2014 USENIX conference on USENIX Annual Technical Conference (USENIX ATC'14), Garth Gibson and Nickolai Zeldovich (Eds.), USENIX Association, Berkeley, CA, USA, 2014, pp. 133-144.

Wires et al., "Characterizing storage workloads with counter stacks" In Proceedings of the 11th USENIX conference on Operating Systems Design and Implementation (OSDI'14), USENIX Association, Berkeley, CA, USA, 2014, pp. 335-349.

Xiang et al., 2013, "HOTL: a higher order theory of locality", In Proceedings of the eighteenth international conference on Architectural support for programming languages and operating systems (ASPLOS '13), ACM, New York, NY, USA, 2013, 14 pages.

Zhong et al., 2009, "Program locality analysis using reuse distance", ACM Transactions on Programming Languages and Systems, vol. 31(6), Aug. 2009, 39 pages.

* cited by examiner

VARIABLE CACHE FOR NON-VOLATILE MEMORY

BACKGROUND

A cache locally stores data from a main memory (e.g., a volatile memory device, a non-volatile memory device, etc.). Caches are often implemented using volatile memory that store data when powered and lose memory state when power is removed. Accordingly, data in a cache may be lost or deemed unreliable in the event of a system shut down or power failure.

A central processing unit (and/or memory controller) uses a cache to increase the speed of data operations because accessing data in cache may be faster than performing read and/or write operations in the main memory. For example, a CPU retrieves data from main memory and stores the retrieved data in a cache line (e.g., 64 bytes of data) of the cache when the data is to be used, edited, manipulated, etc. via read and/or write operations. If the data is modified in the cache, then it is to be written back to main memory. After modifying the data in the cache line, but before the modified data is written back from the cache to the main memory, the cache line storing is, therefore, inconsistent with the data of the main memory. Such cache lines are to be written back (e.g., flushed) to a non-volatile memory in order to maintain persistence of the cache data.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
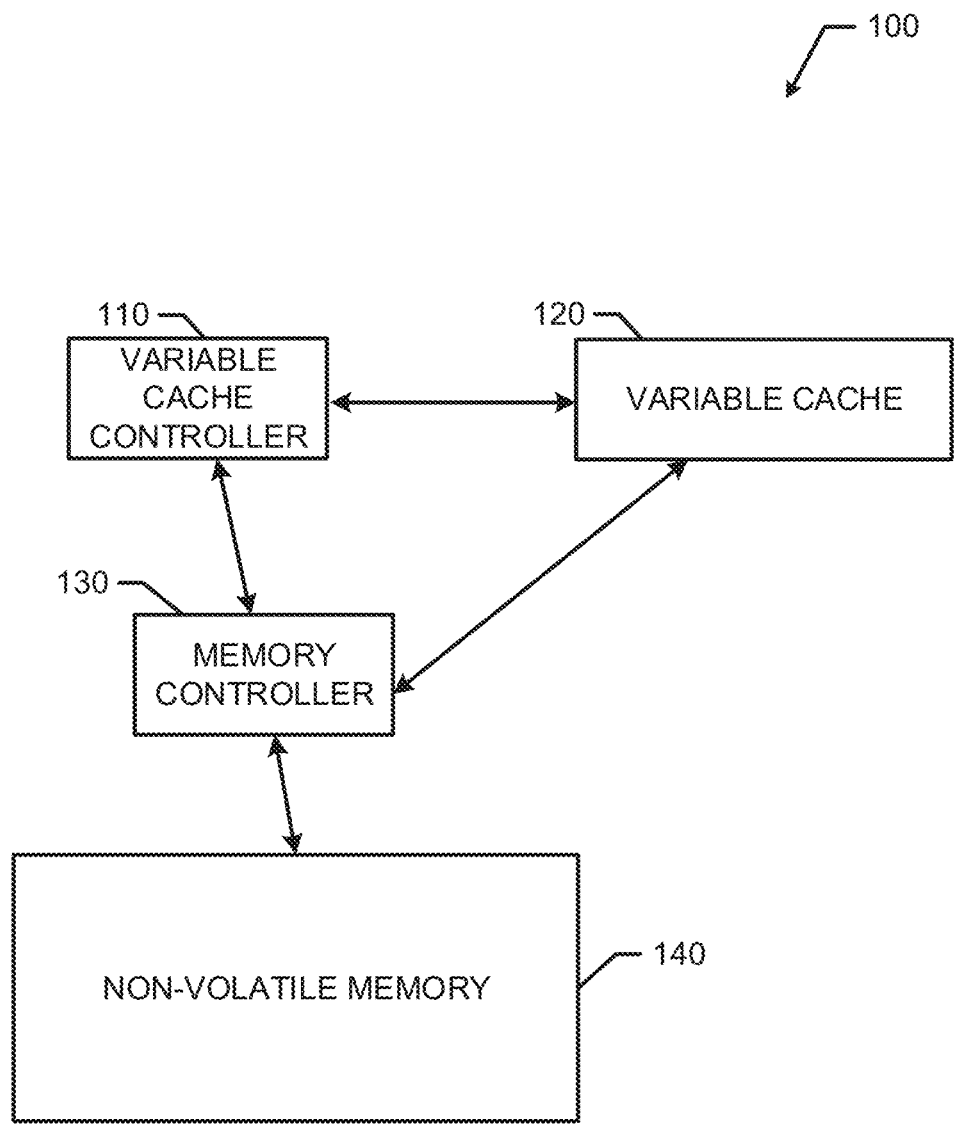
FIG. 1 is a block diagram of an example cache system including a variable cache controller and a variable cache that may be implemented in accordance with an aspect of this disclosure.

Examples disclosed herein involve a variable cache for a non-volatile memory. In examples herein, a variable cache may be controlled by a variable cache controller. The variable cache controller may adjust a size (or cache line capacity) of the variable cache to most efficiently and effective persist the cache data in the non-volatile memory. Accordingly, the variable cache controller determines a desirable size of the variable cache to ensure that cache data is consistent with corresponding non-volatile memory data.

Non-volatile memory programming is to maintain persistence in non-volatile memory (NVM) in order to effectively recover from machine crashes, failures, shutdowns, etc. However, NVM programming may utilize caches that cause inconsistent states during program execution in the event of a system failure as the caches are volatile and do not maintain memory state after the system failure. To ensure consistency of the NVM, the cache is to be flushed frequently. However, cache flushing may harm program performance as resources of the system are required to flush the cache. If a cache size is too small (i.e., it is frequently full), a cache line is to be flushed for each cache miss to make room for a new cache line. If a cache size is too large, too many cache lines may be stored in it resulting in lengthy cache flush times at a point when the cache is to be emptied (or cleared). Accordingly, examples herein provide for a variable cache that is adjustable to an appropriate size for program execution. The ability to adjust the size of the variable cache enhances program performance by delaying cache flushing to an appropriate point in time, avoiding duplicate cache flushes (flushing a cache line that corresponds to a same NVM object or address multiple times), and avoiding full cache flushes by flushing individual cache lines according to a calculated expiration time.

Examples herein may be useful in connection with any suitable type of persistent storage including NVMs and/or volatile memories having a constant power source (e.g., a battery backup) allowing the volatile memories to operate as long-term storage devices, and/or other pseudo-non-volatile memories (e.g., a dynamic random access memory (DRAM) having a short-term emergency power (e.g., from a battery or super-capacitor) and a non-volatile backing store (e.g., a flash storage capacity equal to the DRAM storage capacity)). For the sake of readability, such persistent storage systems are referred to herein as non-volatile memory (NVM).

Examples herein involve obtaining cache lines corresponding to accesses of a non-volatile memory of a system and monitoring access history of the non-volatile memory, the access history comprising object information of the non-volatile memory accesses. Furthermore, examples determine a number of distinct objects accessed in the access history during a time period and set a size of a variable cache of the system based on the number of distinct objects accessed in the access history during the time period.

FIG. 1 is a block diagram of an example cache system 100 including an example variable cache controller 110 and a variable cache 120 implemented in accordance with the teachings of this disclosure. The example cache system 100 of FIG. 1 includes the variable cache controller 110, the variable cache 120, a memory controller 130, and a non-volatile memory (NVM) 140. The variable cache controller 110 of FIG. 1 controls the variable cache 120 and monitors accesses between the variable cache 120 and the NVM 140 (e.g., via the memory controller 130).

The example cache system 100 may be included in or be implemented by any computing system (e.g., a personal computer, a server, a mobile device, etc.). Accordingly, the cache system 100 may be implemented by hardware or by a combination of hardware and software/firmware. Furthermore, additional components (e.g., processor(s), interface(s), storage device(s) (e.g., other cache(s), dynamic random access memory (DRAM), non-volatile random access memory (NVRAM), etc.) may be included and communicate with the example components of FIG. 1. The example memory controller 130 may be included or executed within a processor of the cache system 100 or a computer platform (e.g., see FIG. 7) implementing the cache system 100.

In examples herein, of FIG. 1 the variable cache controller 110 may dynamically adjust the capacity of the variable cache 120 (e.g., by adjusting a number of cache lines that may be stored in the variable cache 120 or that are capable of being stored in the variable cache 120). For example, the variable cache controller 110 may periodically (e.g., every minute, every hour, every day, etc.) or periodically (e.g., after each NVM access, after a threshold number of NVM accesses, etc.) adjust the size of the variable cache 120. The variable cache controller 110 monitors accesses (e.g., storage events, read events, write events, etc.) to the NVM 140. For example, the variable cache controller 110 may identify when the memory controller 130 accesses (e.g., reads, writes, etc.) data in the NVM 140 and/or the variable cache 120. More specifically, the variable cache controller 110 may obtain a cache line of a NVM access by the memory controller 130 and control the variable cache 120 (e.g., update a cache size, flush cache lines, add the cache line, etc.) based on whether the cache line is included in the variable cache 120 or not included in the variable cache 120.

In examples herein, based on the memory controller 130 accesses to the NVM 140, the example variable cache controller 110 may adjust the capacity of the variable cache 120 (which may be referred to interchangeably herein as a "size of the variable cache"). Accordingly, the variable cache controller 110 of FIG. 1 may determine and set an appropriate size for the variable cache 120 in accordance with examples herein such that undesirable cache flushes of the variable cache 120 or undesirable duplicate flushes of cache lines in the variable cache 120 may be avoided while maintaining persistence of data stored in the variable cache 120 in the event of a failure, crash, or shutdown.

Figure 2:
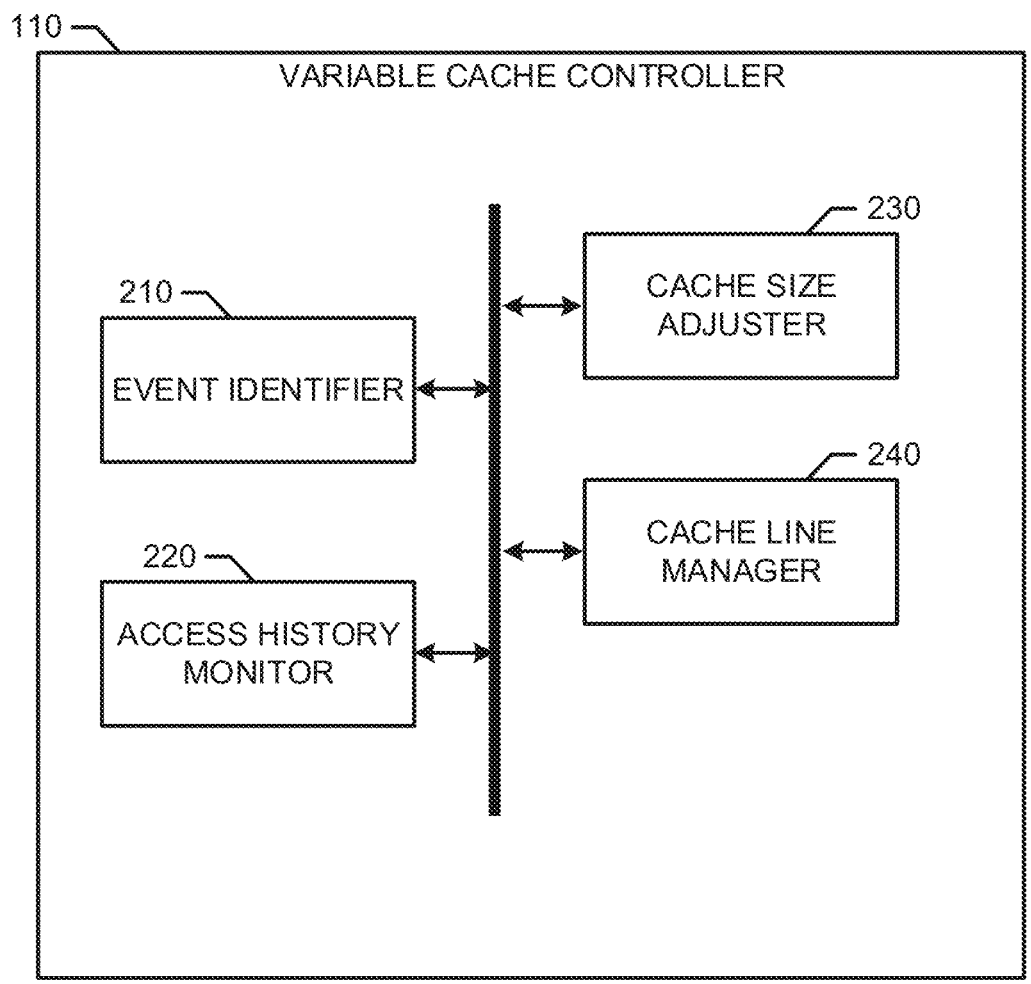
FIG. 2 is a block diagram of an example variable cache controller that may be used to implement the variable cache controller of FIG. 1.

FIG. 2 is a block diagram of an example variable cache controller 110 that may be used to implement the variable cache controller 110 of FIG. 2. The example variable cache controller 110 of FIG. 2 includes an example event identifier 210, an example access history monitor 220, an example cache size adjuster 230, and an example cache line manager 240. The variable cache controller 110 of FIG. 2 may control the variable cache 120 and update cache line data in the variable cache 120 based on access to the NVM 140 in accordance with the examples herein to efficiently and effectively maintain persistence of data.

The example event identifier 210 of FIG. 2 detects accesses to the NVM 140 by the memory controller 130. The event identifier 210 may then forward access information corresponding to the NVM access to the access history monitor 220. The example accesses information may include timing information (e.g., timing corresponding to when the access was initiated, occurred, or completed), identification information (e.g., cache line information, object identification, address information corresponding to an address of the NVM 140, location information corresponding to a location of the NVM 140, etc.), access type (e.g., read, write, etc.).

The example access history monitor 220 of FIG. 2 maintains access information from the event identifier 210 in a record (e.g., a database, a log, etc.) such that the variable cache controller 110 monitors or has access to a history of accessing the NVM 140. The example history monitor 220 may store access information that includes object information corresponding to accesses occurring during a designated time period (e.g., the last hour, the last 5 hours, the last day, the last week, etc.) and timing information associated with the accesses. The example object information may include an object identifier (i.e., an identification of data), an address in the NVM 140, a location in the NVM 140, etc. In some examples, the access history monitor 220 may store the access information in chronological order (based on timing information of the access) and/or based on object information (corresponding to object identifications, NVM address or NVM location information, etc.). Accordingly, the access history monitor 220 may maintain the record of access information such that the cache size adjuster 230 may analyze the access history to determine a number of distinct objects (or addresses/locations of the NVM 140) accessed during a time period.

The example cache size adjuster 230 of FIG. 2 adjusts the size (or capacity) of the variable cache based on the access history tracked by the access history monitor 220. In some examples, the cache size adjuster 230 periodically refers to the access history monitor 220 to determine whether to adjust the size of the variable cache 120. For example, the cache size adjuster 230 may be set to analyze the access history after a threshold period of time (e.g., a minute, an hour, a day, etc.). Additionally or alternatively, the cache size adjuster 230 may dynamically adjust a variable cache size after each NVM access or after a threshold number of NVM accesses (e.g., every 10 NVM accesses, every 100 NVM accesses, etc.).

In examples herein, the cache size adjuster 230 analyzes the record of access information maintained by the access history monitor to determine an appropriate cache size for the variable cache 120. The appropriate size may be determined by calculating a miss ratio curve (MRC) over the course of a time period using access information from the access history. The MRC indicates a number of cache misses relative to the size of the variable cache 120 at a point in time or during a time period. In examples herein, the cache size adjuster 230 may perform a footprint calculation of the accesses during the time period to calculate the MRC during the time period. The example footprint calculation may be used to derive the MRC based on calculating average number of distinct object accesses during various windows of the access history or of a time period of the access history. The example various windows may have various start points, various end points, various lengths, etc. during a time period of the access history to determine the footprint. The footprint may then be determined or representative of an average number of distinct objects accessed during the access history or during a time period of the access history. The example distinct objects may correspond to a same address or location of the NVM 140. Based on the MRC calculation, the cache size adjuster 230 may determine an appropriate cache size for the cache. For example, for objects a, b, c, d, e, f, g in the NVM 140, the cache size adjuster 230 may analyze the following trace of the memory controller 130 accessing the NVM 140 during a time period: abcdeabcdeabcde. In such an example, only the objects a, b, c, d, e, were accessed. Accordingly, based on a footprint calculation to determine the MRC of that trace during the time period, the cache size adjuster 230 may determine that just five distinct objects were accessed and may set the size of the variable cache 120 to five.

Thus, in examples herein, the cache size adjuster 230 may identify patterns of distinct object accesses in the access history tracked by the access history monitor 220. The example patterns may include a same order of accessing the distinct objects or a random order of accessing the distinct objects, Regardless, the cache size adjuster 230 seeks to adjust the size of the variable cache 120 to correspond to the number of distinct objects (or an average number of distinct objects) accessed during a given time period. Therefore, each distinct object may be allocated a single cache line of the variable cache 120 (such that multiple cache lines of the variable cache are not occupied by a same object).

The example cache line manager 240 of FIG. 2 manages cache line data within the variable cache 120. In examples herein, the cache line manager 240 facilitates adding, removing, or updating cache lines (or metadata of cache lines) of the variable cache 120 (e.g., in response to the memory controller 130 accessing the NVM 140). Accordingly, the cache line manager 240 may analyze the cache lines within the variable cache 120 for each NVM access. For example, the cache line manager 240 may determine whether an object (or address, location, etc.) of an NVM access is stored in the variable cache 120 (i.e., a cache line for the example object already exists within the variable cache). Based on whether a cache line already exists for a certain object and whether the variable cache is full (i.e., the number of cache lines of the variable cache 120 has reached the size or maximum capacity of the variable cache), the cache line manager 240 may add the cache line for the object to the variable cache 120, the cache line manager 240 may replace a cache line in the variable cache 120 with a new cache line for the object, or the cache line manager 240 may update metadata for a cache line in the variable cache 120 that includes the object.

In examples herein, the cache line manager 240 identifies an object of an NVM access from the event identifier 210, and scans the variable cache 120 for the object or a cache line including the object to determine whether a cache line already exists. In some examples, the cache line manager 240 may calculate a hash and/or refer to a hash table to determine whether a cache line exists for the object in the variable cache 120 (see FIG. 3). When a cache line does not exist for an object of a NVM access, the cache line manager 240 may add a new cache line for the object to the variable cache 120 when the variable cache is not full (e.g., not at capacity). If the variable cache 120 is full, the cache line manager 240 may identify a cache line to evict (or flush) from the variable cache 120 and then add the new cache line for the object. In examples where a cache line exists in the variable cache 120, the cache line manager 240 may update metadata corresponding to the cache line of the object. The metadata may be updated rather than adding a new cache line for the access in order to avoid multiple cache lines in the variable cache 120 for a same object (i.e., to avoid duplicate cache lines in the variable cache 120). For example, the cache line manager 240 may update timing information corresponding to the access to show when the most recent access occurred for that cache line. Therefore, the cache line manager 240 may additionally maintain metadata of cache lines (or objects of the cache lines).

In examples herein, the cache line manager 240 may implement any suitable replacement policy to remove a cache line from the variable cache 120 in order to add a cache line for an object that does not exist in the variable cache 120. In some examples, the cache line manager 240 may flush a least recently used (LRU) cache line in the variable cache 120. Accordingly, when a new cache line is to be added, the cache line manager 240 may analyze metadata of the cache lines (e.g., timing information corresponding to a most recent access) to determine the longest period since a cache line of the variable cache 120 was accessed. The cache line manager 240 may then flush (or evict) that cache line to make space for the new cache line.

In some examples, the cache line manager 240 of FIG. 2 may flush cache lines using an expiration time. The example expiration time may correspond to a length of time that an object of a cache line has been in the variable cache 120 without having been accessed. The example expiration time may be calculated from a same calculation used to calculate the MRC (e.g., a footprint calculation) to determine the average length of time that objects of the cache lines are remaining in the variable cache 120. For example, the expiration time may be determined from an inverse of a footprint calculation used to determine the average number of distinct objects accessed in the access history. If the expiration time of a cache line is reached, the cache line manager 240 may flush that cache line. Accordingly, after each access of a cache line, the expiration time for that cache line may be updated (e.g., extended).

Thus, in examples herein, the example variable cache controller 110 controls and manages the variable cache 120 to effectively and efficiently persist data of the NVM 140. The variable cache controller 110 determines an appropriate size of the variable cache 120 from access history of the NVM 140 and sets/adjusts the size of the variable cache 210 accordingly.

While an example manner of implementing the variable cache controller 110 of FIG. 1 is illustrated in FIG. 2, at least one of the elements, processes and/or devices illustrated in FIG. 2 may be combined, divided, re-arranged, omitted, eliminated and/or implemented in any other way. Further, the event identifier 210, the access history monitor 220, the cache size adjuster 230, the cache line manager 240 and/or, more generally, the example variable cache controller 210 of FIG. 2 may be implemented by hardware and/or any combination of hardware and executable instructions (e.g., software and/or firmware). Thus, for example, any of the event identifier 210, the access history monitor 220, the cache size adjuster 230, the cache line manager 240 and/or, more generally, the example variable cache controller 210 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the event identifier 210, the access history monitor 220, the cache size adjuster 230, and/or the cache line manager 240 is/are hereby expressly defined to include a tangible machine readable storage device or storage disk such as a memory, a digital versatile disk (DVD), a compact disk (CD), a Blu-ray disk, etc. storing the executable instructions. Further still, the example variable cache controller 110 of FIG. 2 may include at least one element, process, and/or device in addition to, or instead of, those illustrated in FIG. 2, and/or may include more than one of any or all of the illustrated elements, processes and devices.

Figure 3:
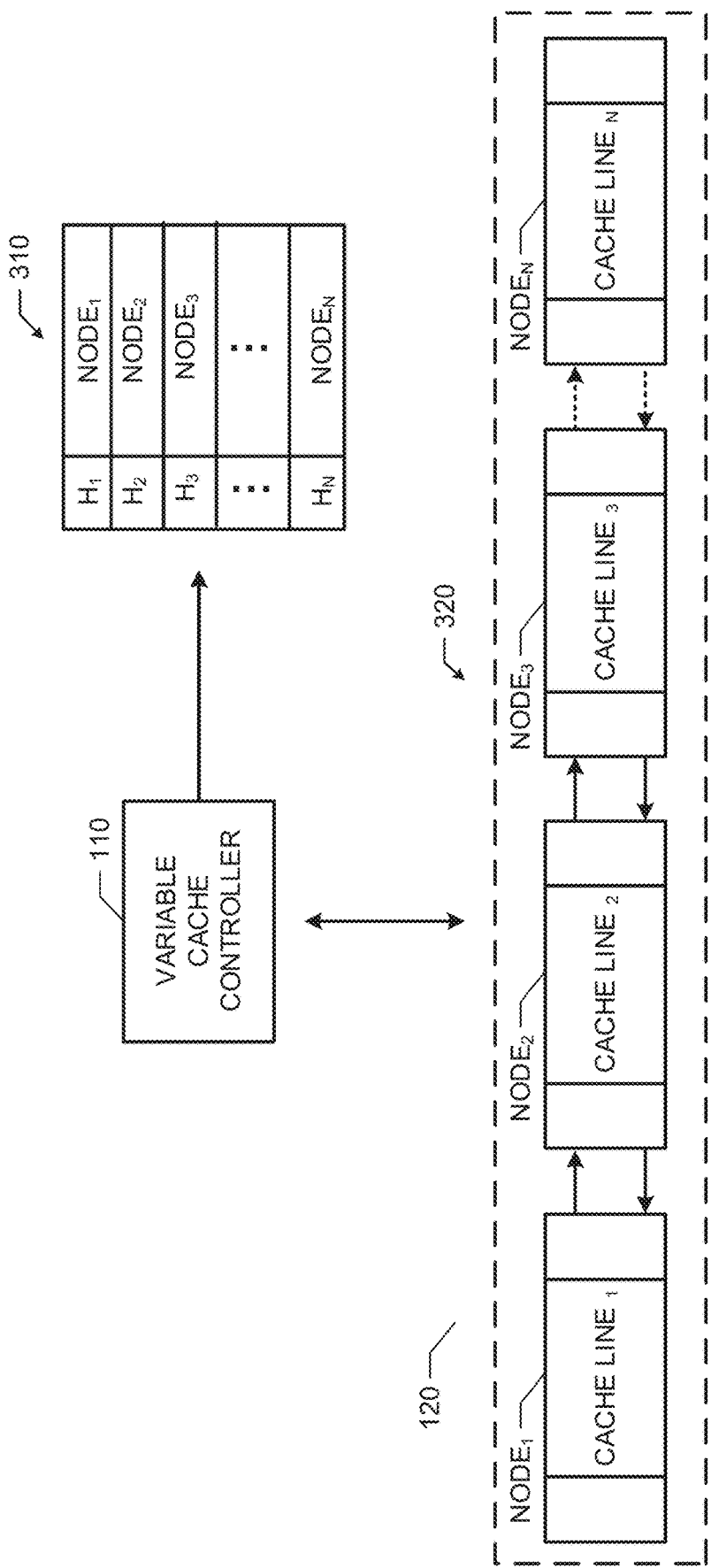
FIG. 3 illustrates an example implementation of the variable cache controller and the variable cache of FIG. 1.

FIG. 3 illustrates an example implementation of the variable cache controller 110 and the variable cache 120 of FIGS. 1 and/or 2. In FIG. 3, the variable cache controller 110 utilizes a hash table 310 to identify and access cache lines 320 (CACHE LINE$_1$ to CACHE LINE$_N$) of the variable cache 120. The example hash table 310 includes hashes H$_1$ to H$_N$ corresponding to nodes NODE$_1$ to NODE$_N$, where N corresponds to the number N of cache lines in the variable cache 120. The nodes NODE$_1$ to NODE$_N$ correspond to addresses/locations of the cache lines CACHE LINE$_1$ to CACHE LINE$_N$ in the variable cache 120. In examples herein, the hashes H$_1$ to H$_N$ may be calculated and assigned to the cache lines based on objects, addresses, locations, etc. of the cache lines CACHE LINE$_1$ to CACHE LINE$_N$, which correspond to accesses to the NVM 140. Thus, after obtaining a cache line corresponding to an access of the NVM 140, the variable cache controller 110 (e.g., via the cache line manager 240), may calculate a hash of the cache line and reference the hash table 310 to determine whether an object, address, location etc. of the access corresponds to a cache line in a node of the variable cache 120. The example hash table 310 thus provides for relatively quick analysis of the variable cache 120 to determine the existence and possible location of an object of a cache line in the variable cache 120.

The example variable cache 120 of FIG. 3 is implemented by a doubly-linked list. Accordingly, the cache lines 320 of FIG. 3 correspond to nodes $NODE_1$ to $NODE_N$ of the doubly-linked list. The example variable cache controller 110 may manage an order of the doubly-linked list. For example, the variable cache controller 110 may organize/sort the cache lines of the doubly-linked list based on expiration time (i.e., by adjusting pointers of the nodes $NODE_1$ to $NODE_N$). Accordingly, the variable cache controller 110 (via the cache line manager 240) may quickly identify whether a first node $N_1$ of the doubly-linked list has reached an expiration time. If so, then the variable cache controller 110 (e.g., via the cache line manager 240) may flush any of the cache lines 320 that have reached the respective expiration times. As mentioned above, the expiration time may be updated for a cache line of a NVM access that exists in the variable cache 120. Accordingly, in some examples, the variable cache controller 110 may maintain a hash table (e.g., a hash table attached to the hash table 310 or in addition to the hash table 310) that maps a time to a node that has an expiration time on (or after) the current time. The example times included in the hash table may be a sliding window of times corresponding to the access history tracked by the access history monitor 220 and/or the calculations of the cache size adjust 230 (similar to the calculation of the expiration time). Using this hash table, the variable cache controller 110 may insert (or adjust a placement of a cache line) the cache into the doubly-linked list more quickly/efficiently than traversing the entire doubly-linked list to identify the proper location of the cache line based on the expiration time.

Accordingly, the variable cache controller 110 may control a variable cache 120 implemented by a doubly linked list using the hash table 310 and/or any other hash table. The example data structures of FIG. 3 may enable the variable cache controller 110 to access a particular cache line of the variable cache 120 rather than causing the variable cache controller 110 to traverse the variable cache 120 line by line.

Figure 4:
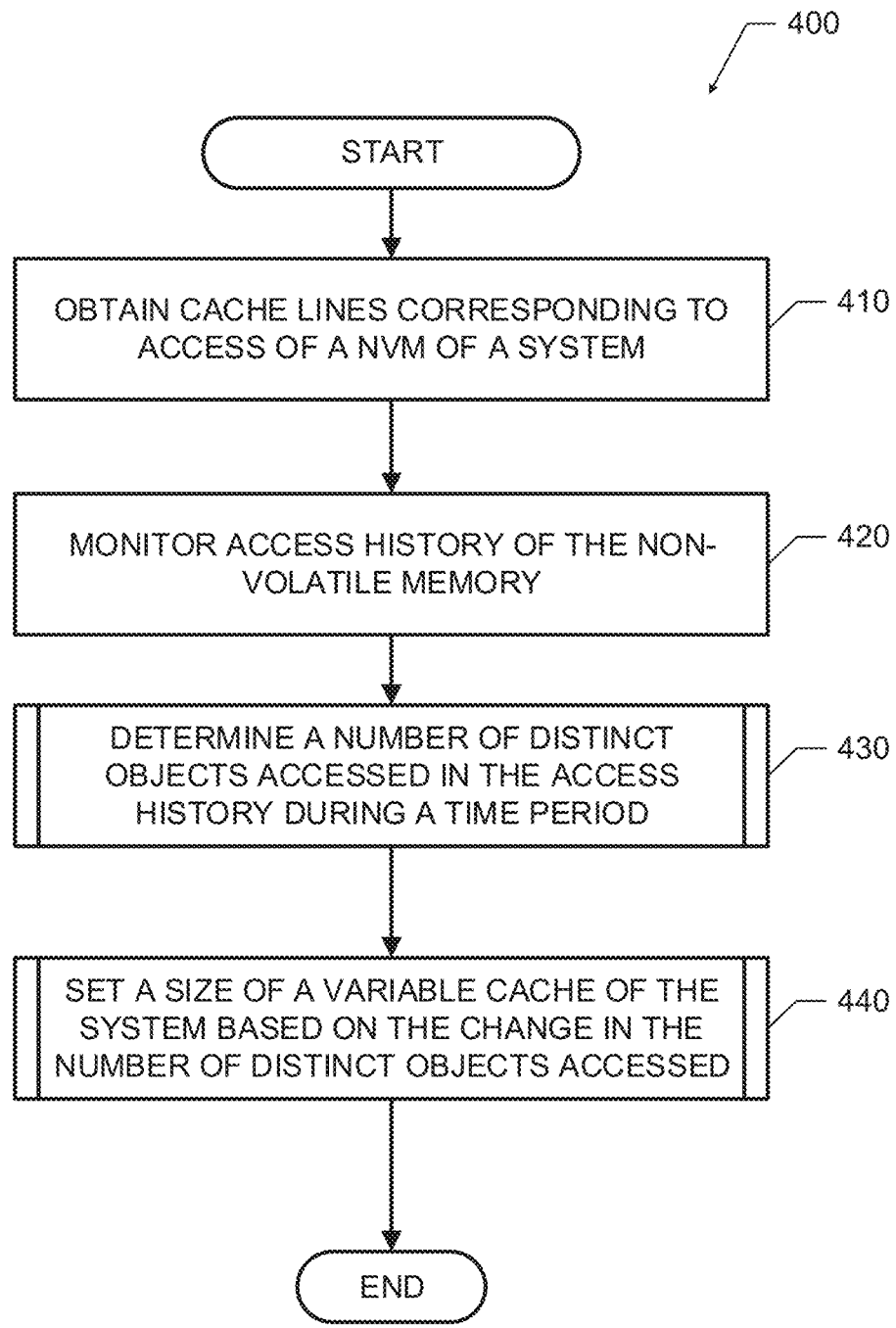
FIG. 4 is a flowchart representative of example machine readable instructions that may be executed to implement the variable cache controller 110 of FIG. 2.
Figure 5:
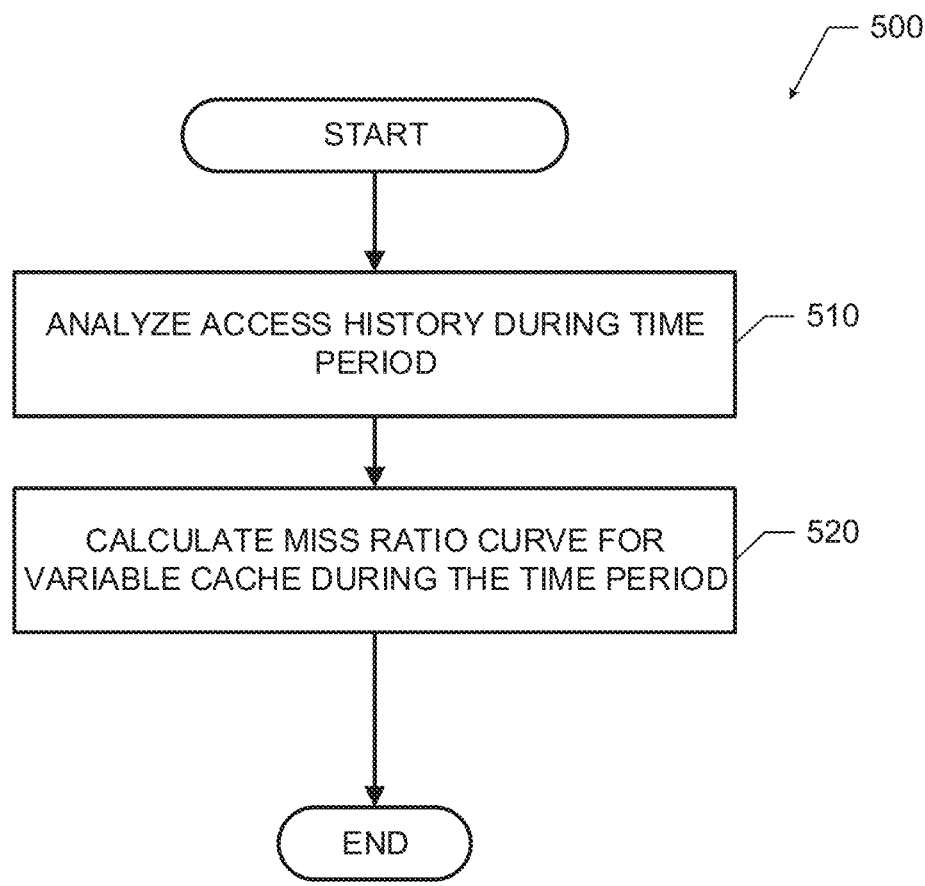
FIG. 5 is a flowchart representative of an example portion of the example machine readable instructions of FIG. 4 to implement the variable cache controller of FIG. 2.
Figure 6:
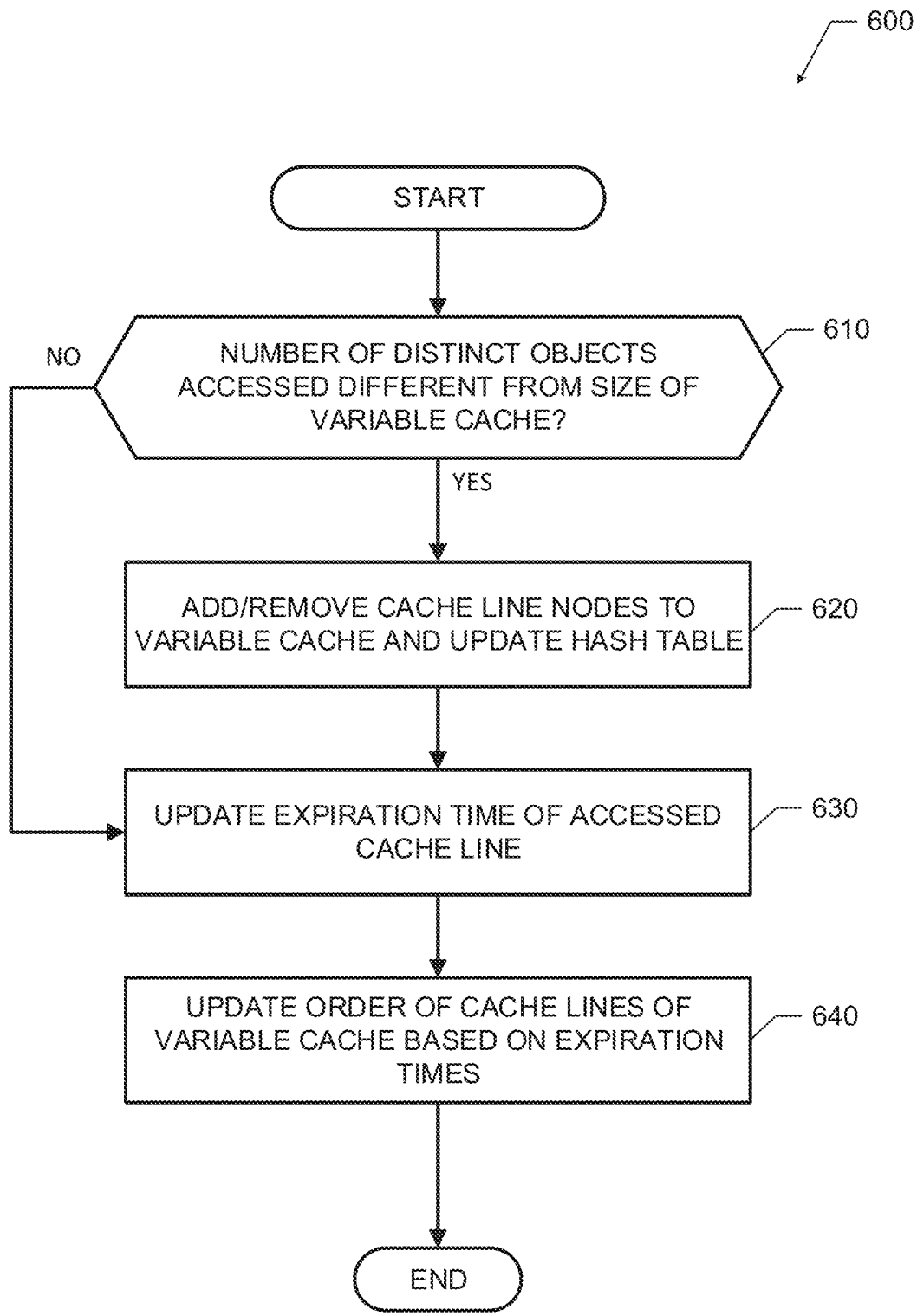
FIG. 6 is a flowchart representative of another example portion of the example machine readable instructions of FIG. 6 to implement the variable cache controller of FIG. 2.

Flowcharts representative of example machine readable instructions for implementing the variable cache controller 110 of FIG. 2 are shown in FIGS. 4, 5, and 6. In this example, the machine readable instructions comprise a program(s)/process(es) for execution by a processor such as the processor 712 shown in the example processor platform 700 discussed below in connection with FIG. 7. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entirety of the program(s)/process(es) and/or parts thereof could alternatively be executed by a device other than the processor 712 and/or embodied in firmware or dedicated hardware. Further, although the example program(s)/process(es) is/are described with reference to the flowcharts illustrated in FIGS. 4, 5, and/or 6, many other methods of implementing the example variable cache controller 110 may alternatively be used. For example, the order of execution of the blocks may be changed, and/or some of the blocks described may be changed, eliminated, or combined.

The example process 400 of FIG. 4 begins with an initiation of the variable cache controller 110 (e.g., upon startup, upon instructions from a user, upon startup of a device implementing the variable cache controller 110 (e.g., the cache system 100), etc.). The process 400 may be executed to control the variable cache 120 and/or to set/adjust a size of the variable cache 120. In some examples, the process 400 may be iteratively executed each time the memory controller 130 access the NUM 140 of FIG. 1. At block 410, the event identifier 210 obtains a cache line corresponding to an access of the NVM 140 of the cache system 100. For example, at block 410, the event identifier 210 may detect the memory controller 130 is accessing the NUM 140 and retrieve information from the access, such as an object identifier, an address of the NVM 140, a location of the NVM 140, etc. At block 420, the access history monitor 220 monitors accesses to the NVM 140, For example, at block 420, the access history monitor 220 may log the access of block 410 in a record.

At block 430, the cache size adjuster 230 determines a number of distinct objects accessed in the access history during a time period. For example, the cache size adjuster 230 may calculate an MRC during the time period (see FIG. 5). The cache size adjuster 230, at block 440, sets a size of the variable cache 120 of the cache system 100 based on the number of distinct objects accessed. For example, at block 440, for a variable cache 120 implemented by a doubly linked list, the cache size adjuster 230 may add a node or nodes to a doubly-linked list if the cache size adjuster 230 is to increase the size of the variable cache 120, may remove a node or nodes from the doubly linked list. After block 440, the example process 440 ends. In some examples, after block 440 ends, control may return to block 410 or the variable cache controller 110, via the event identifier 210, may monitor for NVM access to execute a subsequent iteration of the example process 400 of FIG. 4 for a subsequent NVM access. Accordingly, after a subsequent iteration of the example process of FIG. 4, the variable cache 120 may be adjusted from a first cache size corresponding to a first time period in the access history to a second cache size corresponding to a second time period in the access history.

The example process 500 of FIG. 5 begins with an initiation of the cache size adjuster 230 (e.g., periodically during operation of the variable cache controller 110, after detection of an NVM access, etc.). The example process 500 of FIG. 5 may be executed to implement block 430 of FIG. 4 to determine a number of distinct objects of an access history. At block 510 of FIG. 5, the cache size adjuster 230 analyzes the access history of the NVM 140 during a time period (e.g., a most recent time period, a time period corresponding to a threshold number of NUM accesses, etc.). For example, the cache size adjuster 230 may analyze a log or record of the access history maintained by the access history monitor 220.

At block 520 of FIG. 5, the cache size adjuster 230 calculates the MRC for the variable cache 120 during the timer period. For example, the cache size adjuster 230 may perform a footprint calculation from the access history that provides an average number of distinct objects accessed during the time period (based on calculating the averages for a plurality of various windows or time periods during the access history). After block 520, the example process 500 ends. In some examples, after block 520, control may advance to block 440 of FIG. 4.

The example process 600 of FIG. 6 begins with an initiation of the variable cache controller 110. The example process 600 may be executed to implement block 440 of FIG. 4. At block 610, the cache size adjuster 230 determines whether the number of distinct objects accessed during a present time period is different from the size of the variable cache 120. If the number of distinct objects accessed is not different from the size of the variable cache 120 (e.g., the number of nodes N of the doubly-linked list of FIG. 3), control advances to block 630. If the number of distinct object accessed is different from the size of the variable 120 (block 610), then the cache size adjuster 230 adds/removes cache line nodes (or spaces) to the variable cache 120 and updates a hash table accordingly. For example, at block 620, the cache size adjuster 230 may allocate cache space to add new cache line nodes to the variable cache 120 or may remove the cache space to remove the cache line nodes. Referring to the example of FIG. 3, at block 620, the cache size adjuster may add/remove nodes of the doubly-linked list corresponding to the adjustment of the variable cache 120.

At block 630 of FIG. 6, the cache line manager 240 updates expiration times corresponding to the access history. For example, the cache line manager 240 may update metadata of the cache lines to indicate most recent times that objects of the cache lines have been accessed. At block 640, the cache line manager 240 updates the order of the cache lines of the variable cache based on the expiration times of the cache lines (e.g., the cache line manager 240 may adjust pointers of the nodes of the doubly-linked list to set the order). After block 640, the example process 600 ends.

As mentioned above, the example processes of FIGS. 4, 5, and/or 6 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
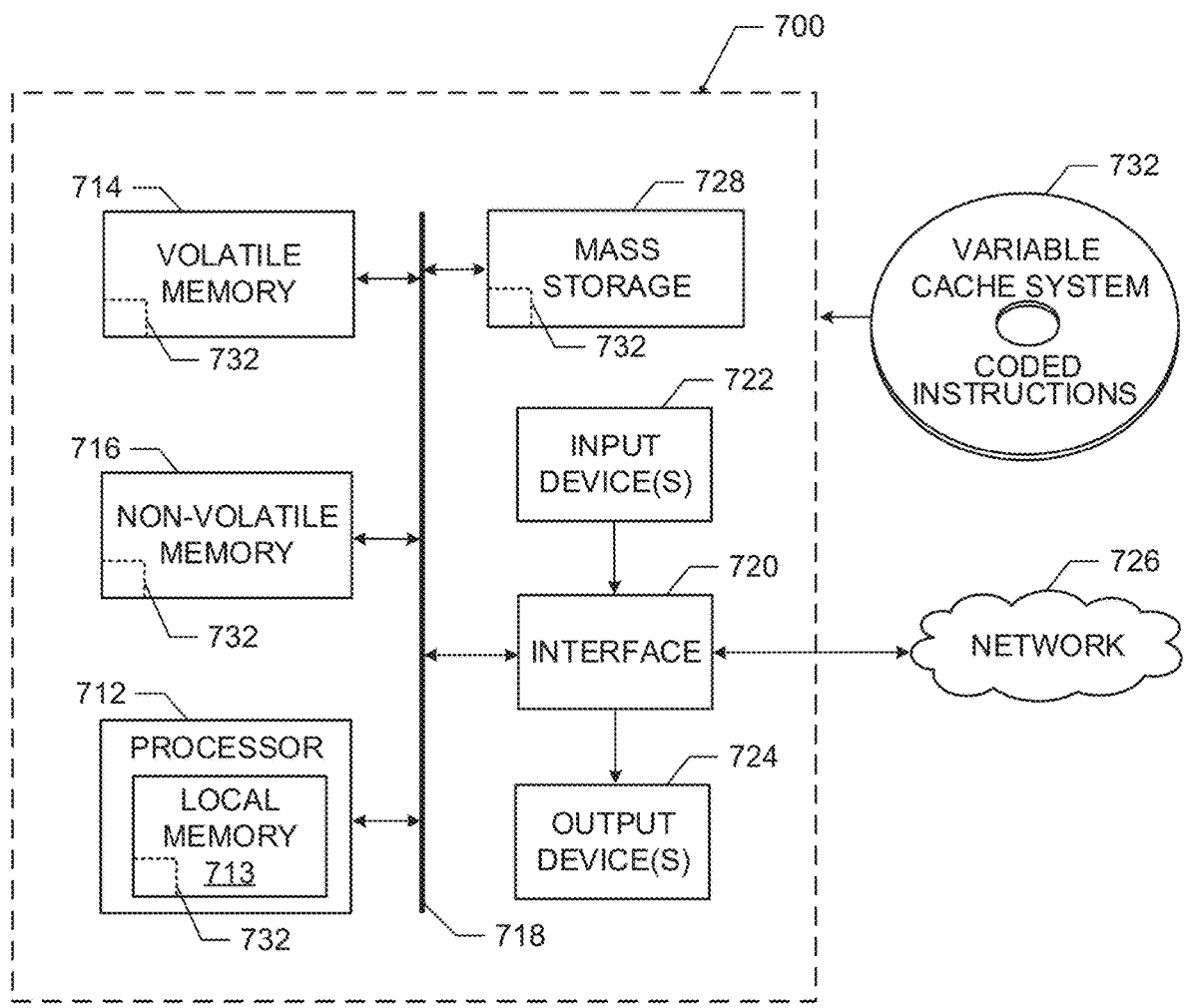
FIG. 7 is a block diagram of an example processor platform capable of executing the instructions of FIGS. 4, 5, and/or 6 to implement the variable cache controller of FIG. 2.

FIG. 7 is a block diagram of an example processor platform 700 capable of executing the instructions of FIGS. 4, 5, and/or 6 to implement the variable cache controller 110 of FIG. 2. The example processor platform 700 may be or may be included in any type of apparatus, such as a server, a personal computer, a mobile device (e.g., a cell phone, a smart phone, a tablet, etc.), a personal digital assistant (PDA), an Internet appliance, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 (which may be used to implement the NVM 140 of FIG. 1) via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller (e.g., the memory controller 130 of FIG. 1).

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives. The example mass storage device 728 may be used to implement the NVM 140 of FIG. 1.

The coded instructions 732 of FIGS. 4, 5, and/or 6 may be stored in the mass storage device 728, in the local memory 713 in the volatile memory 714, in the non-volatile memory 716, and/or on a removable tangible machine readable storage medium such as a CD or DVD.

From the foregoing, it will be appreciated that the above disclosed methods, apparatus and articles of manufacture provide a variable cache and a variable cache controller that adjusts a size of a variable cache to effectively and efficiently provide persistence for NVM data. The example variable cache controller may analyze an access history of an NVM and adjust the size of the variable cache based on a number of distinct objects accessed in during a time period of the access history. Accordingly, the variable cache is dynamically adjusted during operation or program execution to provide a most appropriate cache size that provides increase performance by enabling efficient flushing of the variable cache.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory machine readable storage medium comprising instructions that, when executed, cause a machine to at least:
    obtain cache lines corresponding to accesses of a non-volatile memory of a system;
    monitor access history of the non-volatile memory, the access history comprising object information of the non-volatile memory accesses;
    determine a number of distinct objects accessed in the access history during a time period from the object information;
    perform a footprint calculation of the access history during the time period from the object information of the access history during the time period to determine the miss ratio curve, the footprint calculation to provide an average number of distinct objects accessed during the time period;
    maintain a hash table that maps expiration times to cache lines, the hash table identifying one or more cache lines that are to be flushed when the expiration time is reached, the expiration times are determined based on an inverse of the footprint calculation; and
    set a size of a variable cache of the system based on the number of distinct objects accessed in the access history during the time period.

2. The non-transitory machine readable storage medium of claim 1, wherein the instructions, when executed, further cause the machine to:
    determine a miss ratio curve from the object information of the access history for the time period based on a previous size of the variable cache, the miss ratio curve to indicate the number of cache misses based on a size of the variable cache during the time period.

3. The non-transitory machine readable storage medium of claim 1, wherein the instructions, when executed, further cause the machine to:
    perform the footprint calculation by determining an average number of distinct objects accessed during a plurality of various windows during the time period.

4. The non-transitory machine readable storage medium of claim 1, wherein the instructions, when executed, further cause the machine to:
    set the size of the variable cache by adjusting a number of nodes of a doubly-linked list, the nodes of the doubly-linked list corresponding to cache lines of the variable cache.

5. An apparatus comprising:
    an event identifier to identify accesses of a non-volatile memory;
    an access history monitor to monitor the access history of the non-volatile memory;
    a cache size adjuster to adjust the size of a variable cache based on the a number of distinct objects in the access history accessed during a time period, the size of the variable cache corresponding to a number of cache lines capable of being stored in the variable cache; and
    a variable cache manager to maintain access times of the cache lines and to maintain cache lines based on the size of the variable cache and the metadata of the cache lines,
    wherein the variable cache manager maintains a hash table that maps expiration times to cache lines, the hash table to direct the cache manager to cache lines that are to be flushed when the expiration time is reached, the expiration times are determined based on an inverse of a footprint calculation, and
    wherein the cache size adjuster performs a footprint calculation of the access history during the time period from the object information of the access history during the time period to determine the miss ratio curve, the footprint calculation to provide an average number of distinct objects accessed during the time period.

6. A method comprising:
    obtaining a first cache line corresponding to an access of a non-volatile memory;
    monitoring access history of the non-volatile memory;
    analyzing the access history of a non-volatile memory during a first time period after the obtaining the first cache line;
    performing a footprint calculation of the access history during the time period from the object information of the access history during the time period to determine the miss ratio curve, the footprint calculation to provide an average number of distinct objects accessed during the time period;
    maintaining a hash table that maps expiration times to cache lines, the hash table identifying one or more cache lines that are to be flushed when the expiration time is reached, the expiration times are determined based on an inverse of a footprint calculation; and
    calculating a first cache size of a variable cache of the system based on the access history of the non-volatile memory during the first time period, the first cache size comprising a first number of cache lines in the cache;
    analyzing the access history of a non-volatile memory during a second time period after obtaining a second cache line; and
    adjusting the first cache size to a second cache size in response to a change in the access history during the first time period and the second time period, the second size of the cache comprising a second number of cache lines that is different than the first number of cache lines.

7. The method as defined in claim 6, further comprising detecting the change in the access history by identifying a different set of objects of the non-volatile memory accessed in the first time period than the second time period.

8. The method as defined in claim 7, further comprising calculating a miss ratio curve during the first time period and the second time period based on the footprint calculation, the miss ratio curve used to determine the first cache size for the first time period and the second cache size for the second time period, respectively.

9. The method as defined in claim 6, further comprising:
obtaining a cache line of a non-volatile memory access;
adding the cache line to the cache; and
storing an object identifier of the non-volatile memory access in the access history of the non-volatile memory.

10. The method as defined in claim 6, further comprising:
obtaining a new cache line of a non-volatile memory access;
when the cache is full, flushing a least recently used cache line from the cache to the non-volatile memory; and
inserting the new cache line to the cache.

11. The method as defined in claim 10, further comprising:
retrieving a metadata corresponding to cache lines of the cache, the metadata comprising most recent access times of the respective cache lines; and
identifying the least recently used cache line based on the metadata.

12. The method as defined in claim 6, further comprising:
obtaining a cache line of a non-volatile memory access;
determining that the cache line is in the cache; and
updating metadata of the cache line indicating that the cache line has been accessed; and
storing an object identifier of the non-volatile memory access in the access history of the non-volatile memory.

* * * * *